United States Patent [19]
Poulet et al.

[11] Patent Number: 5,891,821
[45] Date of Patent: Apr. 6, 1999

[54] AQUEOUS SOLUTION FOR THE IMPREGNATION OF CATALYTIC SUPPORTS, CATALYSTS PREPARED FROM THIS SOLUTION, AND APPLICATION FOR THESE CATALYSTS

[75] Inventors: Olivier Poulet, Ste Croix Sur Aizier; Michel Bourgogne; Philippe Moldan, both of Le Havre, all of France

[73] Assignee: Total Raffinage Distribution, S.A., Puteaux, France

[21] Appl. No.: 430,261

[22] Filed: Apr. 28, 1995

Related U.S. Application Data

[63] Continuation of Ser. No. 27,694, Mar. 8, 1993, abandoned.

[30] Foreign Application Priority Data

Mar. 6, 1992 [FR] France .................................. 92 02741

[51] Int. Cl.$^6$ ............... B01J 23/00; B01J 21/00
[52] U.S. Cl. .................. 502/314; 502/242; 502/258; 502/259; 502/260; 502/263; 502/313; 502/315; 502/332; 502/335; 502/167; 502/170; 502/308; 502/349
[58] Field of Search ................. 502/242, 258, 502/259, 260, 263, 313, 314, 315, 332, 335, 167, 170, 308, 349

[56] References Cited

U.S. PATENT DOCUMENTS

| | | | |
|---|---|---|---|
| 4,003,978 | 1/1977 | Shiraishi et al. | 423/237 |
| 4,080,286 | 3/1978 | Yanik et al. | |
| 4,810,685 | 3/1989 | Twigg et al. | 502/60 |

FOREIGN PATENT DOCUMENTS

| | | |
|---|---|---|
| A-0 189 635 | 9/1985 | European Pat. Off. . |
| A-0 181 035 | 10/1985 | European Pat. Off. . |

*Primary Examiner*—Elizabeth D. Wood
*Attorney, Agent, or Firm*—Frommer Lawrence & Haug LLP; A. Thomas S. Safford

[57] ABSTRACT

A novel aqueous solution for the one step impregnation of catalytic supports, catalysts prepared from such solution, and the preparation and the use of catalysts prepared thereby. The catalysts prepared are used in the hydrotreatment of petroleum fractions and particularly in hydrodesulfurization and/or denitrogenization. The solution is a combination of at least one compound of a metal from group IVa (e.g. Zr), at least one compound of a metal from group VIa (e.g. Mo or W), at least one compound of a metal from group VIII (e.g. Co or Ni), and at least one water soluble amine (e.g. ethylenediamine or MEA).

25 Claims, 1 Drawing Sheet

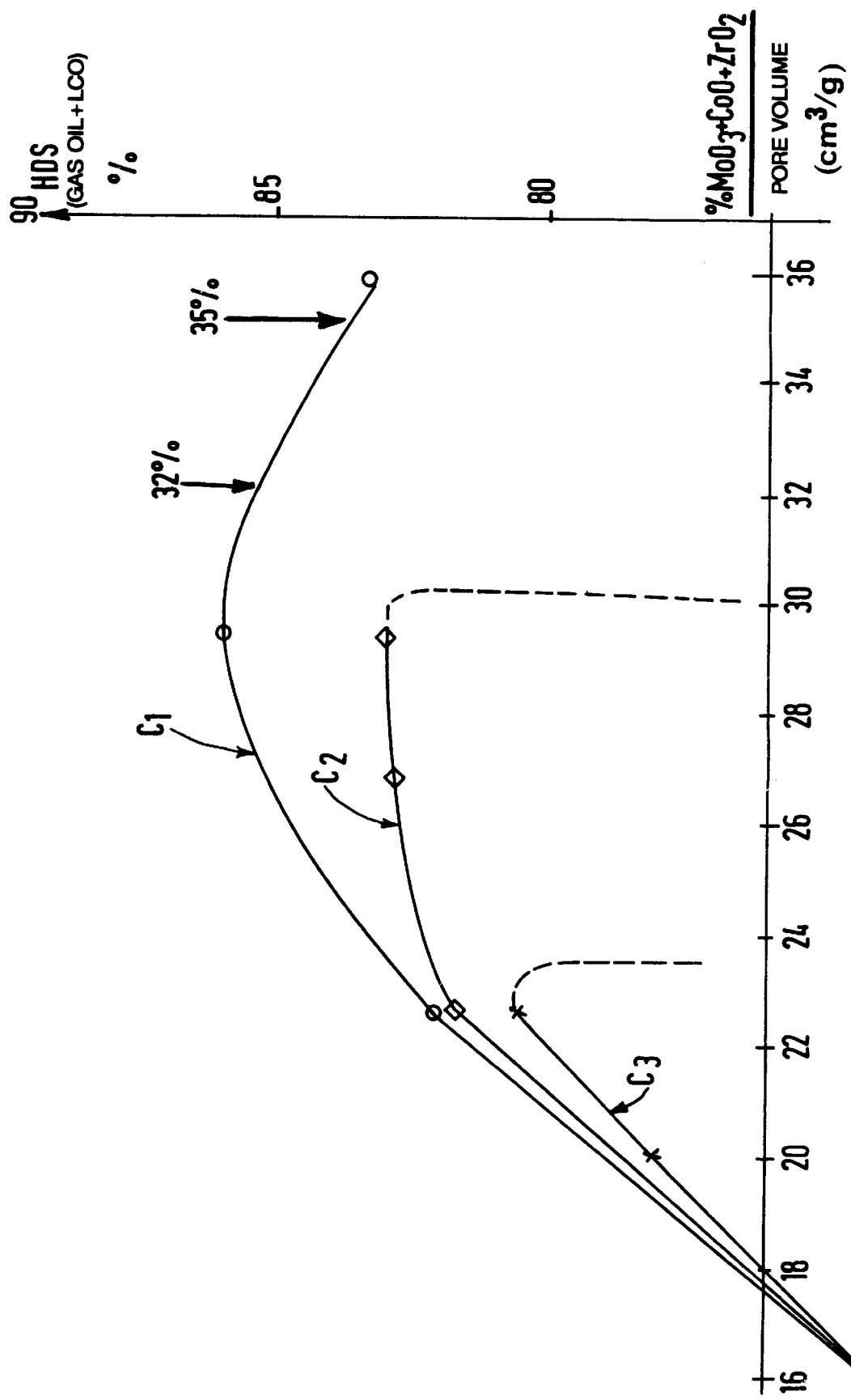

5,891,821

AQUEOUS SOLUTION FOR THE IMPREGNATION OF CATALYTIC SUPPORTS, CATALYSTS PREPARED FROM THIS SOLUTION, AND APPLICATION FOR THESE CATALYSTS

This application is a continuation of application Ser. No. 08/027,694, filed Mar. 8, 1993, and now abandoned.

BACKGROUND OF THE INVENTION

The present invention relates to a novel aqueous solution for the impregnation of catalyst supports. The invention further relates to catalysts prepared from such a solution and to applications for these catalysts.

The invention relates more particularly to the catalysts used in the hydrotreatment of petroleum fractions, and especially to hydrodesulfurization catalysts.

The feedstocks treated in such hydrotreating processes come, from the fractionation of crude petroleum, for example, by distillation at atmospheric pressure and then under reduced pressure, or from a cracking unit (particularly the fraction known as light cycle oil, or LCO).

The products obtained must be desulfurized before they are used as motor fuel or fuel generally, and current laws impose ever greater reductions of the content of sulfurous and nitrogenous compounds of these products.

To meet these requirements in the area of desulfurization, it is possible to adjust the operating conditions of the hydrotreating process. In particular, the quantity of feedstock being treated may be reduced, which, however, has the effect of decreasing the volume produced by the treating unit and of increasing the operating costs.

Furthermore, the treating capacity may be increased or the operating pressure of the process may be raised. However, this would entail a modification of the installations, and consequently substantial investments and excessive construction delays.

To some extent, the temperature at which the hydrodesulfurization reaction is run could also be increased, but this usually shortens the life of the catalyst employed.

Such catalysts frequently comprise a support based on a porous refractory oxide in which at least one metal from groups VIII, IVa and VIa of the periodic table is present. (See, for example, French patents 2,490,507, 2,560,789, 2,598,631 and 2,598,632.)

These catalysts comprise, for example, an alumina support on which cobalt and/or nickel and molybdenum and/or tungsten, generally in the form of oxides, are deposited at the end of the catalyst preparation treatment.

The life and the activity of such catalysts are limited by a progressive poisoning of the active sites by the sulfur and, depending on the nature of the feedstock treated, also by the nitrogenous products, the metals or the high-molecular-weight products present, which promote the formation of coke.

Apart from the oxides of cobalt (and/or of nickel) and of molybdenum (and/or of tungsten), it is also known to use in such catalysts zirconium oxide, either alone (see French patent 1,437,252) or possibly combined with phosphate (see U.S. Pat. Nos. 3,791,967 and 3,546,105).

The zirconium is incorporated in the catalyst either during the preparation of the support, by coprecipitation with the latter from the same solution, or by being mixed with the support in the form of a solid or paste (see U.S. Pat. No. 4,490,479), or then by impregnation of the support from an aqueous solution (see U.S. Pat. No. 4,344,867).

The last-mentioned method usually involves a double impregnation of the support. (See U.S. Pat. Nos. 1,437,252 and 3,840,473.) The support is first impregnated with a solution of a zirconium salt, this first impregnation being followed by drying and calcination. It is then impregnated in one or more stages with a solution of a nickel or cobalt salt (a nitrate, for example) and with a solution of a molybdenum compound (ammonium paramolybdate, for example), these impregnations being likewise followed by drying and optionally by calcination. While the catalysts so prepared possess satisfactory catalytic properties, their contents of molybdenum and cobalt oxides are generally too low since if present in large amounts these metals, deposited in a second impregnation, might cover the zirconium atoms previously deposited.

OBJECTS OF THE INVENTION

It would therefore be desirable to impregnate the catalyst support with a single solution of compounds of metals from groups IVa, VIa and VIII.

Moreover, it is clear that to lengthen the service life of the catalysts the active-metal content of the impregnating solution is advantageously increased. However, this could result in the precipitation of some of the compounds present, either because of an inappropriate pH of the solution or because of an unduly high concentration thereof.

It is catalysts of this type with which the present invention is concerned. An object of the invention is to provide a stable aqueous impregnating solution comprising simultaneously metals from groups IVa, VIa and VIII, which solution lends itself to an easier and more efficient mode of carrying out the method of preparation of these catalysts by a single impregnation of a support of porous refractory oxide and calcination thereof.

A further object of the invention is to provide an aqueous solution of this type which comprises simultaneously such concentrations of metals from groups IVa, VIa and VIII, which solution is suitable for the impregnation of a support of porous refractory oxide by the so-called incipient-wetness method, which involves using a volume of impregnating solution that approaches the available pore volume of the support.

Finally, a still further object of the invention is to provide an aqueous impregnating solution of this type that will yield catalysts for the hydrotreatment of petroleum feedstocks, and more particularly for the hydrodesulfurization of such feedstocks, which possess higher catalytic activity than the catalysts of the prior art.

SUMMARY OF THE INVENTION

To this end, the invention has as a preferred embodiment an aqueous solution suitable for use in the impregnation of a catalyst support, characterized in that it comprises simultaneously at least one compound of a metal from group IVa, at least one compound of a metal from group VIa, at least one compound of a metal from group VIII, and at least one amine soluble in water.

Applicants have found, in fact, that the presence in such an impregnating solution of a water-soluble amine has the effect of increasing the stability of the solution and of preventing the precipitation from it of some of the metallic compounds simultaneously present, even in high concentrations. More particularly, applicants have found that when such an impregnating solution is maintained at a basic pH, compounds of zirconium or titanium can be incorporated in it and maintained at high concentration in solution in the presence of compounds of cobalt or nickel and of compounds of molybdenum or tungsten.

Ethylenediamine, diethanolamine, monoethanolamine, ethylenediaminetetraacetic acid (EDTA), pyridine, piperidine, etc., may be used as the amine.

In the impregnating solution, there may also be present the usual additives of the art, and in particular, neutralizing or precipitating agents such as ammonia, soda, potassium, ammonium carbonate, quaternary ammoniums, tartrates, etc.

Such an impregnating solution may have a concentration of at least 150 grams per liter, for example, of the metals from the three groups IVa, VIa and VIII combined. The concentration of group IVa metal, zirconium or titanium may range from 15 to 22 grams/liter of impregnating solution.

Similarly, the concentration of group VIa metal (molybdenum and tungsten) and of group VIII metal (cobalt or nickel) may range from 113 to 333 grams/liter and from 23 to 108 grams/liter, respectively.

The atomic ratio between the quantity of group VIII metal and the quantity of group VIa metal preferably ranges from 0.33 to 0.54 while the mol ratio between the quantity of group VIa metal compound and of the amine present in the solution is preferably not higher than 0.75.

The invention has as a further embodiment a method of preparation of a catalyst, comprising a single step of impregnating a porous mineral support with an aqueous impregnating solution as described above, this impregnating step being followed, in a known manner, by a drying step and a calcination step.

The calcination step comprises heat treatment wherein the catalyst is heated to a temperature of at least 350° C. over a period of at least one hour.

As has been pointed out above, the step of impregnating the porous support is preferably carried out by the incipient wetness method, that is, the volume of the impregnating solution preferably ranges from about 90 to about 120 percent of the pore volume of the support.

The latter support may be an alumina, a silica-containing alumina, a zirconium oxide or the like. Preferably, this support comprises an alumina of high surface area, having a large pore volume exceeding 0.5 cm$^3$/g, and preferably exceeding 0.9 cm$^3$/g.

A further embodiment of the invention is to provide a catalyst for the hydrotreatment of hydrocarbons prepared by the method described and, more particularly, a catalyst for the hydrodesulfurization of petroleum feedstocks, characterized in that the ratio between the total content of metals from group IVa, group VIa and group III present on the catalyst, expressed as oxides, and the pore volume of the support ranges from 16 to 35 g/cm$^3$, and preferably from 18 to 32 g/cm$^3$.

The ratio between the quantity of group VIa metals present on the catalyst, expressed as oxides, and the pore volume of the support preferably ranges from 14 to 30 g/cm$^3$ while the ratio between the quantity of metals from groups VIa and VIII, expressed as oxides, and the pore volume of the support ranges from 14 to 33 g/cm$^3$.

Finally, the invention has as a still further embodiment the use of a catalyst of the type just mentioned in a process for the treatment of hydrocarbons containing sulfurous and/or nitrogenous compounds, and particularly in a process for the treatment of petroleum feedstocks containing from 0.01 to 2.5 percent by weight of sulfurous compounds and/or from 10 to 1,500 ppm of nitrogenous compounds.

BRIEF DESCRIPTION OF THE DRAWING

FIG. 1 which is a diagram illustrating the rate of desulfurization of the 50:50 gas-oil/LCO cut used in Example 12 as a function of the ratio of the quantity of oxides $MoO_3$+ $CoO+ZrO_2$, expressed in percent, present on the catalyst to the pore volume of the support, expressed in cm$^3$/g.

DETAILED DESCRIPTION OF THE PREFERRED EMBODIMENTS OF THE INVENTION

In the examples which follow, various modes of carrying out the invention are described and the results obtained are compared with those previously known.

Examples 1 to 6 and 11 to 13 relate to the preparation of catalysts by the method in accordance with the invention. Examples 7 to 10 relate to the preparation of catalysts by the prior-art method. Example 12 relates to hydrodesulfurization tests using the catalysts prepared in the other examples.

The present invention is illustrated by the examples which follow. These are selected and included for purposes of illustrating in order that others skilled in the art will more fully understand the invention and the principles thereof and will thus be enabled to modify it in a variety of forms, each as may be best suited to the conditions of a particular use.

EXAMPLE 1

(1) Preparation of impregnating solution 8.1 g of ammonium heptamolybdate is dissolved in 10 cm$^3$ of water and 5.6 cm$^3$ of ethylenediamine. 5.4 g of cobalt nitrate, dissolved in 1.5 cm$^3$ of water is then added to the molybdenum solution. 2.55 g of the liquid composition containing zirconium and marketed under the tradename Bacote 20® by Magnesium Electron Ltd. is then added to the aforesaid solution. The final impregnating solution contains 284 grams/liter of metals.

(2) Impregnation of catalyst

A commercial silica-containing alumina (4 wt. % of silica) with a pore volume of 1 cm$^3$/g is used. Its pore volume was determined by the following method: From a 150-gram lot of alumina dried for 24 hours at 120° C., 100 grams of silica-containing alumina is taken.

Water is gently poured on this alumina until the surface of the silica-containing alumina has a moist appearance and the particles appear to be tacky. The volume of water poured over it is substantially equal to the pore volume of the support as used in the remainder of the test.

21.05 cm$^3$ of the previously prepared impregnating solution is slowly poured over 21.05 g of the silica-containing alumina.

(3) Drying and calcination

The support so impregnated in one step, matures at ambient temperature.

The impregnated solid is then dried at 120° C. overnight and then calcined for 4 hours at 500° C. The catalyst so prepared contains 22% of $MoO_3$, 5.4% of CoO and 1.7% of $ZrO_2$, as determined by x-ray fluorescence analysis.

EXAMPLE 2

The preparation procedure of Example 1 is repeated, except that 7.4 g of ammonium heptamolybdate is dissolved in 12 cm³ of water and 5 cm³ of ethylenediamine (EDA), and 5.8 g of cobalt nitrate in 1.5 cm³ of water.

The two solutions obtained are mixed with 2.55 g of Bacote 20®, as in Example 1.

22 cm³ of the impregnating solution so obtained is then poured over 22 g of silica-containing alumina.

EXAMPLE 3

The preparation procedure of Example 1 is repeated, except that 7 g of ammonium heptamolybdate is dissolved in 14 cm³ of water and 4.5 cm³ of EDA. 5.1 g of cobalt nitrate is dissolved in 1.5 cm³ of water. The quantity of Bacote 20® admixed with the two solutions obtained is the same as that used in Example 1.

22.8 cm³ of the solution obtained is then poured over 22.8 g of silica-containing alumina.

EXAMPLE 4

The preparation procedure of Example 1 is repeated, except that 6.1 g of ammonium heptamolybdate is dissolved in 16 cm³ of water and 4 cm³ of EDA. 4.8 g of cobalt nitrate alone is dissolved in 1.5 cm³ of water. The quantity of Bacote 20® is the same as that used in Example 1.

23.34 cm³ of the impregnating solution is then poured over 23.34 g of silica-containing alumina.

EXAMPLE 5

The preparation procedure of Example 1 is repeated, except that the molybdenum compound is dissolved in 8 cm³ of monoethanolamine mixed with 7.6 cm³ of water. The subsequent steps are identical with those of Example 1.

21.05 cm³ of the impregnating solution is then poured over 21.05 g of silica-containing alumina.

EXAMPLE 6

The preparation procedure of Example 5 is repeated, except that ammonium dimolybdate (7.2 g) is used as molybdenum salt.

All other steps are identical with those of Example 1.

21.05 cm³ of the impregnating solution is then poured over 21.05 g of silica-containing alumina.

EXAMPLE 7

In a first step, 2.55 g of Bacote 20® is added to 21 cm³ of water. 23.5 g of silica-containing alumina is impregnated with this solution. The mixture is allowed to mature at ambient temperature, and the product is then oven-dried overnight at 120° C.

In a second step, 6.1 g of ammonium heptamolybdate is dissolved in 15.6 cm³ of water, and 4.80 g of cobalt nitrate is dissolved in 1.5 cm³ of water. The two solutions are then mixed and the 23.5 g of alumina previously impregnated with Bacote 20® is simultaneously impregnated with them.

After maturing at ambient temperature, the product is oven-dried overnight at 120° C. and then calcined for 4 hours at 500° C.

EXAMPLE 8

23.5 g of silica-containing alumina support is impregnated under the same conditions as in the first step of Example 7.

In a first step, 6.1 g of ammonium heptamolybdate is dissolved in a solution containing 12 cm³ of water and 2.37 g of phosphoric acid.

A solution containing 4.80 g of cobalt nitrate dissolved in 1.5 cm³ of water is poured into the solution containing the molybdenum.

The final solution obtained is poured over the silica-containing alumina. The mixture is allowed to mature at ambient temperature. The product is then oven-dried overnight at 120° C. and then calcined for 4 hours at 500° C.

EXAMPLE 9

The preparation procedure of Example 8 is repeated with 22 g of silica-containing alumina, except that 7.4 g of ammonium heptamolybdate is dissolved in a solution containing 11 cm³ of water and 2.37 g of phosphoric acid.

A solution containing 5.8 g of cobalt nitrate dissolved in 1.5 cm³ of water is then added to the solution containing the molybdenum.

EXAMPLE 10

The preparation procedure of Example 8 is repeated with 21.05 g of silica-containing alumina, except that 8.16 g of ammonium heptamolybdate is dissolved in 10 cm³ of water and 2.37 g of phosphoric acid.

A solution containing 6.30 g of cobalt nitrate dissolved in 1.5 cm³ of water is then added to the solution containing the molybdenum.

EXAMPLE 11

This example relates to the preparation of an aqueous impregnating solution with a high molybdenum content.

9.27 g of ammonium heptamolybdate is dissolved in 9 cm³ of water and 6.2 cm³ of ethylenediamine.

7.16 g of cobalt nitrate is dissolved in 2 cm³ of water and the solution obtained is mixed with the solution containing the molybdenum salt and the ethylenediamine.

2.55 g of Bacote 20® is added to the solution containing the cobalt and molybdenum salts and the ethylenediamine.

The final solution obtained is poured over 20.2 g of silica-containing alumina. The mixture is allowed to mature at ambient temperature. The product is then oven-dried overnight at 120° C. and then calcined for 4 hours at 500° C.

EXAMPLE 12

This example relates to the preparation of the same impregnating solution, so far as the contents of elements are concerned, as that prepared in Example 1; however, a different zirconium precursor is used.

8.1 g of ammonium heptamolybdate is dissolved in 10 cm³ of water and 5.6 cm³ of ethylenediamine.

5.4 g of cobalt nitrate, dissolved in 1.5 cm³ of water, is then added to the molybdenum solution.

2.5 g of tartaric acid is added to the foregoing solution, and then 4.45 g of zirconyl chloride.

This stage of the preparation is followed by a step of impregnation, drying and calcination.

EXAMPLE 13

This example relates to the preparation of the same impregnating solution, so far as the contents of elements are concerned, as that prepared in Examples 1 and 12; however, a different zirconium precursor is used.

Thus, 5 g of ammonium bicarbonate ($NH_5CO_3$) and 3.2 g of zirconyl nitrate are added to the solution of molybdenum and cobalt salts.

The purpose of the tests run hereafter is to compare the results obtained using a catalyst prepared by the conventional method (without amine: Example 7; without amine and in an acid medium: Examples 8, 9 and 10) and a catalyst prepared in accordance with the invention (Examples 12 and 13) in a hydrodesulfurization process.

For this purpose, a gas-oil cut and a 50:50 mixture by volume of this gas oil and a light cycle oil (LCO) is used.

As used in this application, "gas oil" is a literal translation of and is intended to have the same meaning as the French term "gazole," which French-speaking persons of ordinary skill in the art would recognize as being a middle distillate (that is to say a rather light product boiling from 150–200° C. to 350–400° C., and typically used as kerosene, home heating oil, diesel motor fuel; and broadly also LCO, i.e. light cycle oil). In U.S. usage the English term "gas oil" is rather ambiguous and, since it can mean atmospheric gas oil and vacuum gas oil, could be a problem if not better defined.

The catalysts were first sulfided at 375° C. with a petroleum fraction of the gas-oil type containing 1 percent by weight of dimethyl disulfide.

The characteristics of the petroleum fractions used and the operating conditions are presented in Table 1 which follows.

TABLE 1

|  | Test with gas oil | Test with gas-oil/LCO mix |
| --- | --- | --- |
| Sulfur (wt. %) | 1.19 | 1.43 |
| Density at 15° C. | 0.8506 | 0.8916 |
| Vol/vol/hr ($h^{-1}$)* | 2.6 | 2.6 |
| $H_2$/HC (std ltr/ltr)** | 150 | 150 |
| Hydrogen pressure (bars) | 30 | 30 |
| Temperature (°C.) | 340 | 340 |

*)Hourly space velocity (volume of reaction mixture treated per volume of catalyst and per hour).
**)Hydrogen/hydrocarbon ratio (standard liters per liter).

The results obtained with the catalysts of Examples 1 to 13 are presented in Tables 2 to 4.

The desulfurization rate, designated % HDS, represents the ratio of the sulfur contents $S_{out}$ of the desulfurized feedstock (sulfur at the reactor outlet) to the sulfur content $S_{in}$ of the feedstock (sulfur at the reactor inlet) multiplied by 100:

$$\% HDS = \frac{S_{out} \text{ content}}{S_{in} \text{ content}} \times 100$$

Table 2 shows that the catalysts prepared in accordance with the invention (Example 4) compare favorably with those according to the usual preparation methods (Examples 7 and 8) having total cobalt, molybdenum and zirconium oxide contents of 22.2 percent.

Table 3 shows that the catalysts prepared in accordance with the invention (Examples 2, 1 and 11, 12 and 13) compare even more favorably with catalysts prepared by impregnation in two steps in an acid medium (Examples 9 and 10) with total cobalt, molybdenum and zirconium oxide contents of 26.6, 29.1 and 32.8 percent.

The very positive technical results from using the invention become manifest when the feedstock (LCO) being treated is high in sulfur and is difficult to desulfurize (which ability to desulfurize such feedstock is particularly desirable).

TABLE 2

| Example No. | Oxide content of catalyst (CoO, $MoO_3$, $ZrO_2$) (%) | Support (pore volume) | Impregnating Method | HDS TEST (%) Gas oil | HDS TEST (%) Gas oil/LCO |
| --- | --- | --- | --- | --- | --- |
| 7 | 22.2 (4.0 + 16.5 + 1.7) | Silica-containing alumina (1 $cm^3$/g) | Two impregnating steps: 1st step: Zr 2nd step: Mo + Co Neutral medium, no amine | 85.2 | 80.7 |
| 8 | 22.2 (4.0 + 16.5 + 1.7) | Silica-containing alumina (1 $cm^3$/g) | Two impregnating steps: 1st step: Zr 2nd step: Co + Mo + phosphoric acid | 84.8 | 81.7 |
| 4 | 22.2 (4.0 + 16.5 + 1.7) | Silica-containing alumina (1 $cm^3$/g) | According to the invention | 85.6 | 82 |

TABLE 3

| Example No. | Oxide content of catalyst (CoO, MoO$_3$, ZrO$_2$) (%) | Support (pore volume) | Impregnating method | HDS TEST (%) Gas oil | Gas oil/LCO |
|---|---|---|---|---|---|
| 9 | 26.6 (4.9 + 20 + 1.7) | Alumina (1 cm$^3$/g) | Two impregnating steps Acid medium (H$_3$PO$_4$) | 85.7 | 82.9 |
| 2 | 26.6 (4.9 + 20 + 1.7) | Alumina (1 cm$^3$/g) | Only one impregnation in basic medium according to invention | 88.3 | 84 |
| 10 | 29.1 (5.4 + 22 + 1.7) | Alumina (1 cm$^3$/g) | Two impregnating steps Acid medium (H$_3$PO$_4$) | 86.9 | 83 |
| 1 | 29.1 (5.4 + 22 + 1.7) | Alumina (1 cm$^3$/g) | Only one impregnation in basic medium according to invention | 90.1 | 86 |
| 11 | 32.8 (6 + 25 + 1.7) | Alumina (1 cm$^3$/g) | Only one impregnation in basic medium according to invention | 88.2 | 84.3 |
| 12 | 29.1 (5.4 + 22 + 1.7) | Alumina (1 cm$^3$/g) | Only one impregnation in basic medium according to invention | 90 | 85.9 |
| 13 | 29.1 (5.4 + 22 + 1.7) | Alumina (1 cm$^3$/g) | Only one impregnation in basic medium according to invention | 90.2 | 86.2 |

TABLE 4

| Example No. | Impregnating solution Amine (mol/l) | Mo (g/l) | Co (g/l) | Zr (g/l) | Support (3) Pore volume cm$^3$g/l | Atomic ratio Co/Mo | CoO + MoO$_3$ + ZrO$_3$ Pore volume (g/cm$^3$) CoO + MoO$_3$ + ZrO$_2$ (%) | Hydro-desulfurization test Gas oil | Gas oil/LCO 50:50 |
|---|---|---|---|---|---|---|---|---|---|
| 1 | 0.55 (1) | 207 | 59 | 17.7 | 1 | 0.46 | 29.1 (5.4 + 22 + 1.7) | 90.1 | 86 |
| 2 | 0.49 (1) | 182 | 52 | 17.1 | 1 | 0.47 | 26.6 (4.9 + 20 + 1.7) | 88.3 | 84 |
| 3 | 0.5 (1) | 158 | 44 | 16.5 | 1 | 0.46 | 24 (4.3 + 18 + 1.7) | 86.9 | 83.2 |
| 4 | 0.49 (1) | 141 | 40 | 16.1 | 1 | 0.47 | 22.5 (4.3 + 16.5 + 1.7) | 85.6 | 82 |
| 5 | 0.39 (2) | 207 | 59 | 17.1 | 1 | 0.46 | 29.1 (5.4 + 22 + 1.7) | 89.8 | 85.9 |
| 6 | 0.49 (1) | 207 | 59 | 17.1 | 1 | 0.46 | 29.1 (5.4 + 22 + 1.7) | 89.6 | 85.5 |
| 11 | 0.5 (1) | 248 | 71 | 18.7 | 1 | 0.46 | 32.8 (6.11 + 25 + 1.7) | 88.2 | 84.3 |
| 12 | 0.55 (1) | 207 | 59 | 17.7 | 1 | 0.46 | 29.1 (5.4 + 22 + 1.7) | 90 | 85.9 |
| 13 | 0.55 (1) | 207 | 59 | 17.7 | 1 | 0.46 | 29.1 (5.4 + 22 + 1.7) | 90.2 | 86.2 |

(1) Ethylenediamine
(2) Ethanolamine
(3) Silica-containing alumina
(l) Liter

As is apparent from Example 11, the method of the invention provides for the preparation of catalysts by impregnation of a porous support with a solution having a high metal content. In contrast thereto, the usual methods call for a double impregnation of the porous support, without addition of an amine, because the impregnating solution does not permit the use of solutions with high metal concentrations; the salts of the solution will crystallize at much lower concentrations than with the aqueous solution in accordance with the invention.

This is apparent from the single figure of the accompanying drawing.

In the diagram, curve $C_1$ represents a catalyst prepared in accordance with the invention, while curve $c_2$ relates to a preparation method using two successive impregnations of the support, the first with ZrO$_2$, the second with both CoO and MoO$_3$. Curve $C_3$ represents a preparation method similar to that of $C_2$ but with impregnations in an acid medium.

Curve $C_1$ is not limiting with respect to type of support. Its shape may vary slightly from one support to another while remaining within the limits of this invention.

It should be noted that the catalysts prepared in accordance with the invention are more active than those prepared conventionally, and that while their activity may vary depending on their oxide content and on the feedstock being treated, their activity level is superior to that obtained with known catalysts.

The instant application is based on French Patent Application No. 92.02741, filed Mar. 6, 1992, the disclosure of which applicants hereby incorporate by reference.

We claim:

1. A hydrodesulfurization of hydrocarbons catalyst prepared by a method having only a single impregnation step, which method comprises the steps of:
   (A) impregnating a porous mineral support with an aqueous solution consisting essentially of
      (i) at least one compound of a metal from group IVa,
      (ii) at least one compound of a metal from group VIa selected from the group consisting of tungsten and molybdenum,
      (iii) at least one compound of a metal from group VIII, and
      (iv) at least one water soluble amine, to form an impregnated mineral support;
   (B) drying the impregnated mineral support to form a dried impregnated mineral support; and,
   (C) calcining the dried impregnated mineral support.

2. The hydrodesulfurization of hydrocarbons catalyst as defined in claim 1, wherein the concentration of metals from groups IVa, VIa and VIII combined is at least 150 g/l in the solution.

3. The hydrodesulfurization of hydrocarbons catalyst as defined in claim 1, wherein the group IVa metal concentration ranges from 15 to 22 g/l in the solution.

4. The hydrodesulfurization of hydrocarbons catalyst as defined in claim 1, wherein the group VIa and group VIII metal concentrations in the solution range from 113 to 333 g/l and from 23 to 108 g/l, respectively.

5. The hydrodesulfurization of hydrocarbons catalyst as defined in claim 1, wherein the atomic ratio between the quantity of group VIII metal and the quantity of group VIa metal ranges from 0.33 to 0.54.

6. The hydrodesulfurization of hydrocarbons catalyst as defined in claim 1, wherein the molar ratio between the quantity of the group VIa metal compound and the amine is not higher than 0.75.

7. The hydrodesulfurization of hydrocarbons catalyst as defined in claim 1, wherein the group VIII metal is selected from the group consisting of cobalt and nickel.

8. The aqueous solution as defined in claim 1, wherein the amine is selected from the group consisting of ethylenediamine and monoethanolamine.

9. The hydrodesulfurization of hydrocarbons catalyst as defined in claim 1, wherein the amine is selected from the group consisting of ethylenediamine and monoethanolamine.

10. The catalyst as defined in claim 1, wherein the volume of the impregnating solution ranges from 90 to 120 percent of the pore volume of the support.

11. The catalyst as defined in claim 1, wherein the support is an alumina or a silica-containing alumina.

12. The catalyst as defined in claim 1 wherein the pore volume of the support is higher than 0.5 cm$^3$/g.

13. The catalyst as defined in claim 12, wherein the pore volume of the support is higher than 0.9 cm$^3$/g.

14. A catalyst for the hydrodesulfurization hydrocarbons which catalyst is prepared by a method having only a single impregnation step, which method consists essentially of the steps of:
   (A) impregnating a porous mineral support in a single step with an aqueous impregnating solution which consists essentially of:
      (i) at least one compound of a metal from group IVa,
      (ii) at least one compound of a metal from group VIa selected from the group consisting of tungsten and molybdenum,
      (iii) at least one compound of a metal from group VIII, and
      (iv) at least one water soluble amine, to form an impregnated mineral support;
   (B) drying the impregnated mineral support to form a dried impregnated mineral support; and
   (C) calcining the dried impregnated mineral support; wherein the ratio between the total content of deposited metals, expressed as oxides, and the pore volume of the support, ranges from 16 to 35 g/cm$^3$.

15. The catalyst as defined in claim 14, wherein the ratio between the total content of deposited metals, expressed as oxides, and the pore volume of the support, ranges from 18 to 32 g/cm$^3$.

16. A catalyst for the hydrodesulfurization of hydrocarbons as defined in claim 1, wherein the ratio between the content of metals from group VIa of the catalyst, expressed as oxides, and the pore volume of the support, ranges from 14 to 30 g/cm$^3$.

17. A catalyst for the hydrodesulfurization of hydrocarbons as defined in claim 1, wherein the ratio between the content of metals from groups VIa and VIII, expressed as oxides, and the pore volume of the support, ranges from 14 to 33 g/cm$^3$.

18. The hydrodesulfurization of hydrocarbons catalyst as defined in claim 2, wherein the group IVa metal concentration ranges from 15 to 32 g/l, wherein the group VIa and group VIII metal concentrations range from 113 to 333 g/l and from 23 to 108 g/l, respectively, wherein the atomic ratio between the quantity of group VIII metal and the quantity of group VIa metal ranges from 0.33 to 0.54, and wherein the molar ratio between the quantity of the group VIa metal compound and the amine is not higher than 0.75.

19. The hydrodesulfurization of hydrocarbons catalyst as defined in claim 18, wherein the group VIII metal is selected from the group consisting of cobalt and nickel, wherein the group IVa metal is zirconium, and wherein the amine is selected from the group consisting of ethylenediamine and monoethanolamine.

20. The hydrodesulfurization of hydrocarbons catalyst as defined in claim 19, wherein the volume of impregnating solution ranges from 90 to 120 percent of the pore volume of the support, wherein the support is chosen from the group consisting of alumina and silica-containing alumina, and wherein the pore volume of the support is higher than 0.5 cm$^3$/g.

21. The catalyst as defined in claim 14 wherein the group VIII metal is selected from the group consisting of cobalt and nickel.

22. The hydrodesulfurization of hydrocarbons catalyst as defined in claim 21 wherein the group IVa metal is zirconium.

23. The hydrodesulfurization of hydrocarbons catalyst as defined in claim 7 wherein the group IVa metal is zirconium.

24. A method for preparing a hydrodesulfurization catalyst having only a single impregnation step, which method consists essentially of the steps of:
   (A) impregnating a porous mineral support in a single step with an aqueous impregnating solution consisting essentially of (i) at least one compound of a metal from group IVa,
(ii) at least one compound of a metal from group VIa selected from the group consisting of tungsten and molybdenum,
(iii) at least one compound of a metal from group VIII, and
(iv) at least one water soluble amine, to form an impregnated mineral support;

(B) drying the impregnated mineral support to form a dried impregnated mineral support; and (C) calcining the dried impregnated mineral support.

25. An aqueous solution for impregnating a porous mineral support for forming a hydrodesulfurization of hydrocarbons catalyst consisting essentially of (i) at least one compound of a metal from group IVa, (ii) at least one compound of a metal from group VIa selected from the group consisting of tungsten and molybdenum, (iii) at least one compound of a metal from group VIII, and (iv) at least one water soluble amine.

* * * * *